United States Patent
Wu et al.

(10) Patent No.: US 9,621,056 B2
(45) Date of Patent: Apr. 11, 2017

(54) METHOD OF CONTROLLING PHASE-SHIFT FULL-BRIDGE CONVERTER IN LIGHT LOAD OPERATION

(71) Applicant: Chicony Power Technology Co., Ltd., New Taipei (TW)

(72) Inventors: Zhen-Yuan Wu, New Taipei (TW); Tim-Cheung Leung, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 14/974,607

(22) Filed: Dec. 18, 2015

(65) Prior Publication Data
US 2016/0149498 A1    May 26, 2016

Related U.S. Application Data

(63) Continuation of application No. 14/046,273, filed on Oct. 4, 2013, now Pat. No. 9,252,672.

(51) Int. Cl.
 *H02M 3/335* (2006.01)
 *H02M 1/00* (2006.01)
(52) U.S. Cl.
 CPC ........... *H02M 3/33507* (2013.01); *H02M 2001/0006* (2013.01); *H02M 2001/0009* (2013.01); *H02M 2001/0054* (2013.01)
(58) Field of Classification Search
 CPC .................................................. H02M 3/33507
 See application file for complete search history.

(56) References Cited

U.S. PATENT DOCUMENTS

| | | | | |
|---|---|---|---|---|
| 5,132,889 A | * | 7/1992 | Hitchcock | H02M 3/337 363/132 |
| 8,199,530 B2 | * | 6/2012 | Sase | H02M 3/33576 363/17 |

(Continued)

FOREIGN PATENT DOCUMENTS

| | | |
|---|---|---|
| CN | 201426097 Y | 3/2010 |
| TW | M382658 U | 6/2010 |
| TW | I394357 B | 4/2013 |

OTHER PUBLICATIONS

Texas Instrument, Phase-Shifted Full-Bridge, Zero-Voltage Transition Design Considerations, Application Report SLUA 107A, Sep. 1999—Revised Aug. 2011.*

(Continued)

*Primary Examiner* — Emily P Pham
(74) *Attorney, Agent, or Firm* — Muncy, Geissler, Olds & Lowe, P.C.

(57) ABSTRACT

A method of controlling a phase-shift full-bridge (PSFB) converter in a light load operation is provided to switch control modes of the PSFB converter by detecting magnetizing current of a transformer thereof. The method includes following steps: First, the PSFB converter is operated in an extended PSFB control mode when the magnetizing current is larger. Afterward, the PSFB converter is operated in a modified PSFB control mode when the magnetizing current is gradually reduced and electric charges transported by the residual magnetizing current near to or less than a half of the DC input voltage. Finally, the optimal degree of soft switching of the PSFB converter is implemented when the PSFB converter is operated at the modified PSFB control mode. Accordingly, it is to improve overall efficiency, reduce switching losses, and achieve electromagnetic compatibility.

6 Claims, 8 Drawing Sheets

(56) References Cited

U.S. PATENT DOCUMENTS

| | | | | |
|---|---|---|---|---|
| 8,295,068 | B2* | 10/2012 | Lai | H02M 3/335 |
| | | | | 363/132 |
| 8,717,783 | B2* | 5/2014 | Wang | H02M 3/33592 |
| | | | | 363/17 |
| 8,934,265 | B2 | 1/2015 | Hatakeyama et al. | |
| 9,515,562 | B2* | 12/2016 | Dai | H02M 3/3353 |
| 2005/0180175 | A1 | 8/2005 | Torrey et al. | |
| 2008/0247194 | A1* | 10/2008 | Ying | H02M 3/3376 |
| | | | | 363/17 |
| 2011/0194206 | A1 | 8/2011 | Sase et al. | |
| 2012/0249059 | A1 | 10/2012 | Matsumae et al. | |
| 2014/0001858 | A1* | 1/2014 | Kwasinski | H02M 3/33569 |
| | | | | 307/52 |
| 2014/0254203 | A1 | 9/2014 | Dai et al. | |
| 2015/0078036 | A1* | 3/2015 | Jovanovic | H02M 1/10 |
| | | | | 363/17 |

OTHER PUBLICATIONS

T. Qian et al., "Buck/half-bridge input-series two-stage converter," IET Power Electron, 2010, vol. 3, Iss. 6, pp. 965-976.

* cited by examiner

METHOD OF CONTROLLING PHASE-SHIFT FULL-BRIDGE CONVERTER IN LIGHT LOAD OPERATION

CROSS-REFERENCE TO RELATED APPLICATION

This application is a continuation of application Ser. No. 13/046,273 filed on Oct. 4, 2013. The entire disclosure is incorporated herein by reference.

BACKGROUND

1. Technical Field

The present disclosure relates generally to a method of controlling a phase-shift full-bridge converter, and more particularly to a method of controlling a phase-shift full-bridge converter in a light load operation.

2. Description of Related Art

With the development of the semiconductor technology, the trend of designing small, short, thin, and light electronic products is necessary. For the power electronic products, the switching frequency is continually increased in order to effectively reduce volume and weight of the switching power converter. However, the power switch components of the power converter withstand higher switching stresses and also produce more switching losses, once the switching frequency is increased, thus reducing the conversion efficiency of the switching power converter.

Because the conventional switching power converter is operated by the hard switching technology, the switching losses of the power switch components are also with increased if the switching frequency is increased. Therefore, the switching losses would reduce the conversion efficiency, shorten the use life of the switch components, and increase the occupied space and costs of the additional heat-dissipating devices. In addition, the voltage or current surge produced due to the non-ideal switching behavior causes the electromagnetic interference (EMI).

In order to overcome problems caused due to the high-frequency, the soft switching technology is applied to a variety of power electronic products. The soft switching is generally divided into two categories: zero voltage switching (ZVS) and zero current switching (ZCS). ZVS technology means that the voltage difference across two terminals of the power switch component is decreased to zero during the transient period and then the power switch component is turned on. In other words, a product of the voltage difference and the current flowing the power switch component is zero so as to reduce switching losses of the power switch components, restrain the voltage and current surge, increase conversion efficiency and circuit stability, and reduce noise interference and electromagnetic interference.

In addition, there are two possible conditions would occur in the light load operation of the PSFB converter: (1) the resonance energy is insufficient due to the small current at resonance points when the output inductor current is in the continuous conduction mode (CCM); (2) the resonance energy is zero due to zero current at resonance points when the output inductor current is in the discontinuous conduction mode (DCM).

Accordingly, it is desirable to provide a method of controlling a PSFB converter in a light load operation to implement the optimal degree of soft switching the power switches so as to improve the overall efficiency, reduce switching losses, and achieve the electromagnetic compatibility.

SUMMARY

An object of the present disclosure is to provide a method of controlling a phase-shift full-bridge (PSFB) converter in a light load operation to solve the above-mentioned problems. Accordingly, the method of controlling the PSFB converter in the light load operation is provided to switch control modes by detecting magnetizing current of a transformer of the phase-shift full-bridge converter. The method comprising following steps: (a) operating the PSFB converter in an extended PSFB control mode when the magnetizing current of the transformer compared to an output choke current mapped to a primary side thereof is larger; (b) operating the PSFB converter in a modified PSFB control mode when the magnetizing current is gradually reduced until the charge transported by the residual magnetizing current is close to or less than or equal to the charge a half of a DC input voltage; and (c) implementing the optimal degree of soft driving the PSFB converter to double the magnetizing current under the modified PSFB control mode.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
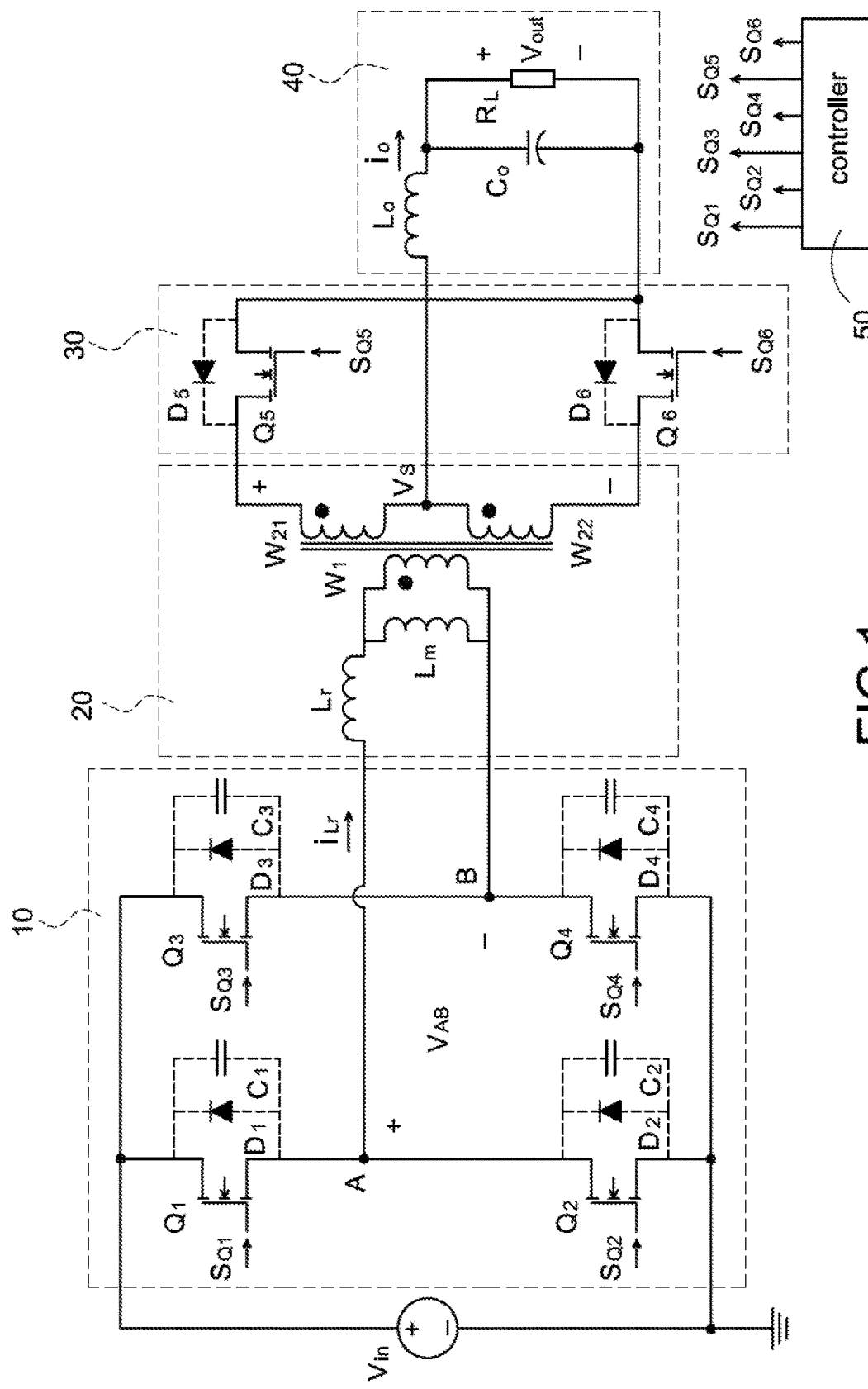
FIG. 1 is a circuit diagram of a phase-shift full-bridge converter (PSFB converter) according to the present disclosure.

Reference will now be made to the drawing figures to describe the present invention in detail.

Reference is made to FIG. 1 which is a circuit diagram of a phase-shift full-bridge converter (PSFB converter) according to the present disclosure. The PSFB converter is electrically connected to a DC input voltage Vin and deliver the energy produced from the DC input voltage Vin to a rear-end load $R_L$. The PSFB converter mainly includes a full-bridge switching circuit 10, a transformer 20, a synchronizing rectifier circuit 30, and a filter circuit 40.

The full-bridge switching circuit 10 has four power switches, namely, a first power switch Q1, a second power switch Q2, a third power switch Q3, and a fourth power switch Q4 to convert the DC input voltage Vin into a square-wave voltage. In particular, each of the power switches has a parasitic diode and a parasitic capacitance which are connected in parallel to the power switch. That is, the first power switch Q1 is connected in parallel to a first parasitic diode D1 and a first parasitic capacitance C1; the second power switch Q2 is connected in parallel to a second parasitic diode D2 and a second parasitic capacitance C2; the third power switch Q3 is connected in parallel to a third parasitic diode D3 and a third parasitic capacitance C3; and the fourth power switch Q4 is connected in parallel to a fourth parasitic diode D4 and a fourth parasitic capacitance C4.

The transformer 20 is a center-tapped transformer, which has one primary-side winding W1 and two secondary-side windings, namely, a first secondary-side winding W21 and a second secondary-side winding W22. The transformer 20 has a magnetizing inductance Lm connected in parallel to the primary-side winding W1 and a resonant inductance Lr connected in series to the primary-side winding W1. In particular, the resonant inductance Lr is equal to the leakage inductance of the transformer 20 or the sum of the leakage inductance of the transformer 20 and an external inductance. The transformer 20 is electrically connected to the full-bridge switching circuit 10 to receive the square-wave voltage and the square-wave voltage is converted and outputted to the secondary side of the transformer 20 according to a turn ratio between the primary-side winding W1 and the first and second secondary-side windings W21, W22. In addition, the transformer 20 provides an isolation function between the primary-side circuits and the secondary-side circuits.

The synchronizing rectifier circuit 30 has a first rectifier transistor Q5 and a second rectifier transistor Q6. The first rectifier transistor Q5 is connected to the first secondary-side winding W21 to synchronously rectify an output voltage generated from the first secondary-side winding W21; the second rectifier transistor Q6 is connected to the second secondary-side winding W22 to synchronously rectify an output voltage generated from the second secondary-side winding W22. In addition, the first rectifier transistor Q5 is connected in parallel to a fifth parasitic diode D5; the second rectifier transistor Q6 is connected in parallel to a sixth parasitic diode D6. The filter circuit 40 has an output filter inductance Lo and an output filter capacitance Co, and is electrically connected to the synchronizing rectifier circuit 30 to filter out high-frequency harmonic components of the rectified voltage outputted from the synchronizing rectifier circuit 30 and provide a DC output voltage Vout to the load $R_L$.

In addition, the PSFB converter is coordinated with a controller 50, and the power switches Q1-Q4 are controlled by phase-shift switching method (phase modulation) by the controller 50. The controller 50 produces a plurality of control signals to correspondingly control the power switches Q1-Q4 and the rectifier transistors Q5-Q6. That is, a first switch control signal $S_{Q1}$ is produced to control the first power switch Q1; a second switch control signal $S_{Q2}$ is produced to control the second power switch Q2; a third switch control signal $S_{Q3}$ is produced to control the third power switch Q3; a fourth switch control signal $S_{Q1}$ is produced to control the fourth power switch Q4; a first transistor control signal $S_{Q5}$ is produced to control the first rectifier transistor Q5; and a second transistor control signal $S_{Q6}$ is produced to control the second rectifier transistor Q6.

Figure 6:
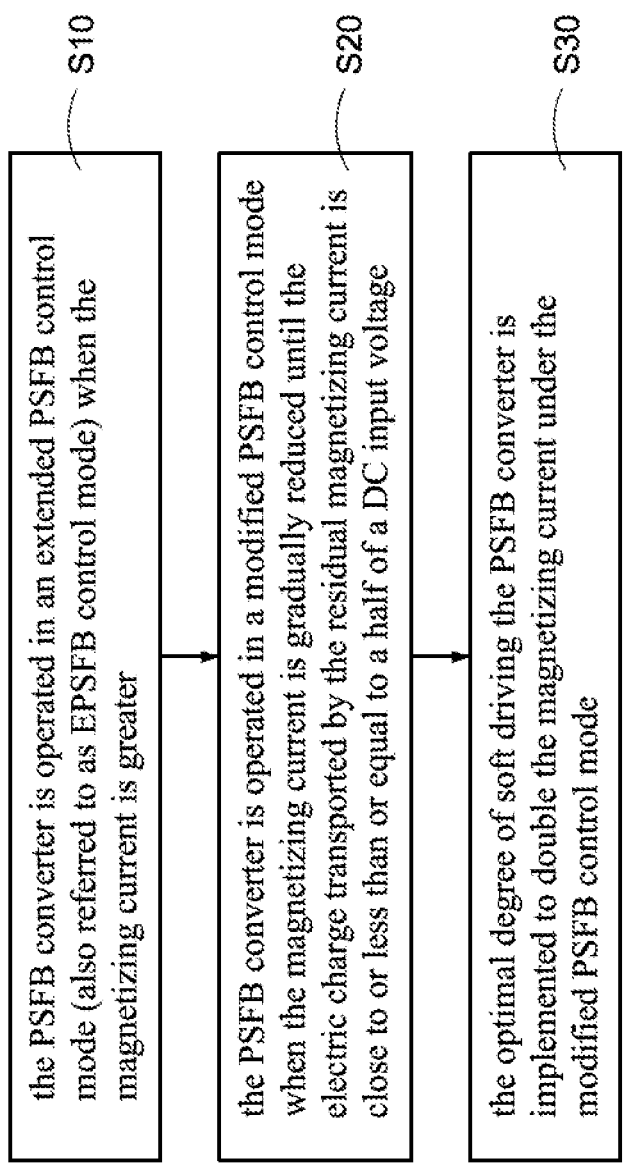
FIG. 6 is a flowchart of a method of controlling the PSFB converter in a light load operation.

Reference is made to FIG. 6 which is a flowchart of a method of controlling the PSFB converter in a light load operation. The method is provided to switch control modes by detecting magnetizing current of a transformer of the PSFB converter. The method has following steps:

First, the PSFB converter is operated in an extended PSFB control mode (also referred to as EPSFB control mode) when the magnetizing current is greater (S10). More specifically, a drain-source voltage of the first power switch is charged by a current difference between the magnetizing current and a primary-side current, and the first power switch is turned on after a waiting time so as to implement the optimal degree of soft switching the first power switch. Also, a drain-source voltage of the second power switch is charged by a current difference between the magnetizing current and a primary-side current, and the second power switch is turned on after a waiting time so as to implement the optimal degree of soft switching the second power switch. In particular, the primary-side current is the current that is converted from the output current of the transformer; the resonance of the current difference is substantially provided by the magnetizing current, the resonance inductance, the output filter inductance, and the equivalent in-parallel capacitance, and the resonance period is much larger than the dead band.

Afterward, the PSFB converter is operated in a modified PSFB control mode when the magnetizing current is gradually reduced until the electric charge transported by the residual magnetizing current is close to or less than or equal to a half of a DC input voltage (S20). More specifically, the duty cycle of the controller continually reduces to gradually reduce the magnetizing current when the loading continually reduces. Under the fixed dead band, the PSFB converter is operated in the modified PSFB control mode when the electric charge transported by the residual magnetizing current is less and less until close to or less than or equal to a half of the DC input voltage.

Finally, the optimal degree of soft driving the PSFB converter is implemented to double the magnetizing current under the modified PSFB control mode (S30). More specifically, the magnetizing current is doubled to ensure that the optimal degree of charging the first power switch by the residual magnetizing current when the PSFB converter is operated in the modified PSFB control mode, and the first power switch is turned on to implement the optimal degree of soft switching the PSFB converter. In particular, the switching losses of the second power switch is equal to $0.25 \times C \times Vin^2$ when the PSFB converter is operated in the modified PSFB control mode, wherein the C is the equivalent capacitance and Vin is the DC input voltage. In addition, the magnetizing current is close to zero after each switching cycle when the PSFB converter is operated in the modified PSFB control mode.

Figure 2A:
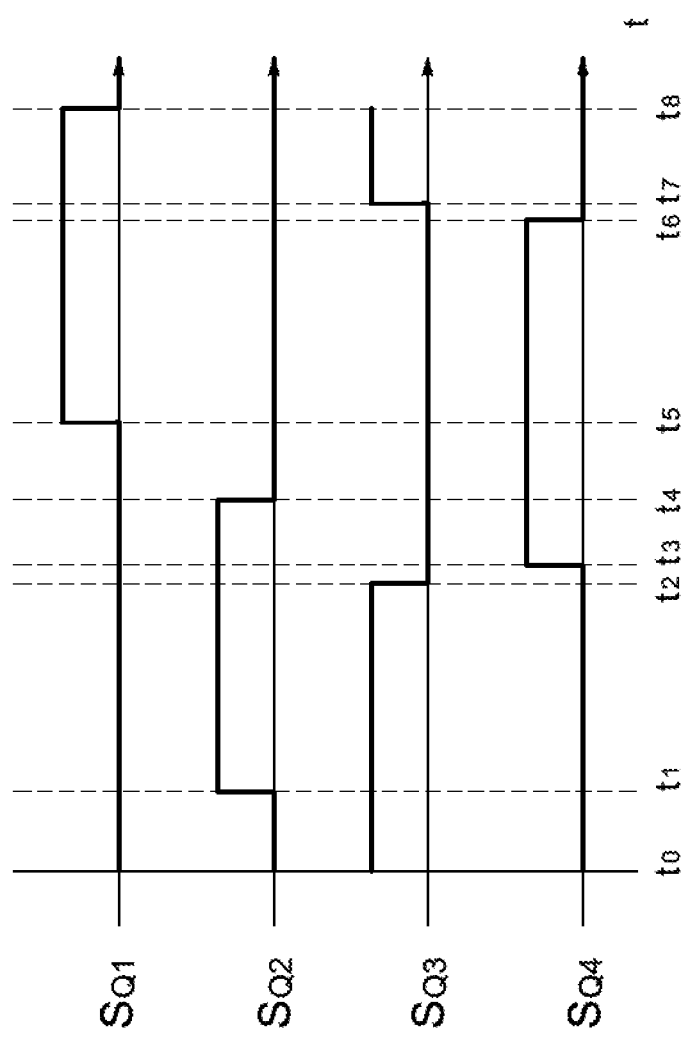
FIG. 2A is a timing diagram of operating the PSFB converter in an extended PSFB control mode according to the present disclosure.
Figure 2B:
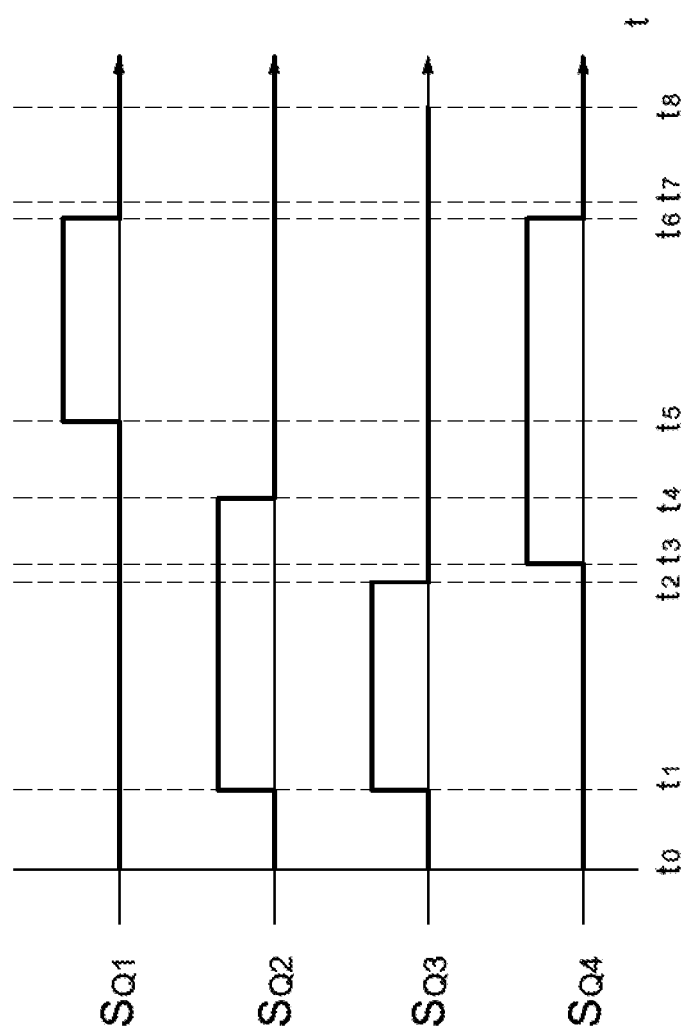
FIG. 2B is a timing diagram of operating the PSFB converter in a modified PSFB control mode according to the present disclosure.

Reference is made to FIG. 2A and FIG. 2B which are a timing diagram of operating the PSFB converter in the extended PSFB control mode and the modified PSFB control mode according to the present disclosure, respectively. The timing diagrams from top to down show signal levels of the first switch control signal $S_{Q1}$, the second switch control signal $S_{Q2}$, the third switch control signal $S_{Q3}$, and the fourth switch control signal $S_{Q4}$. The detailed operation sequence of the PSFB converter is described in different time intervals from time t0 to time t8 as follows and shown in FIG. 2A and FIG. 2B. Especially, from time t1 to time t6, the timing control of the modified PSFB control mode and that of the extended PSFB control mode are identical.

(1) At time t1 and the PSFB converter is operated in the modified PSFB (MPSFB) control mode, the second switch control signal $S_{Q2}$ and the third switch control signal $S_{Q3}$ are simultaneously converted from low level to high level so that the second power switch Q2 and the third power switch Q3 are simultaneously turned on. At this time, the switching losses of the second power switch Q2 and the third power switch Q3 is equal to $2 \times C \times (0.5 \times Vin)^2 = 0.5 \times C \times Vin^2$, respectively. Especially, comparing to the switching losses of the hard switching, the switching losses of the present disclosure is half of the switching losses ($C \times Vin^2$) of the hard switching. At time t1, the energy generated is transported by the residual magnetizing current and the second power switch Q2 is soft switching when the PSFB converter is operated in the extended PSFB control mode.

Figure 3:
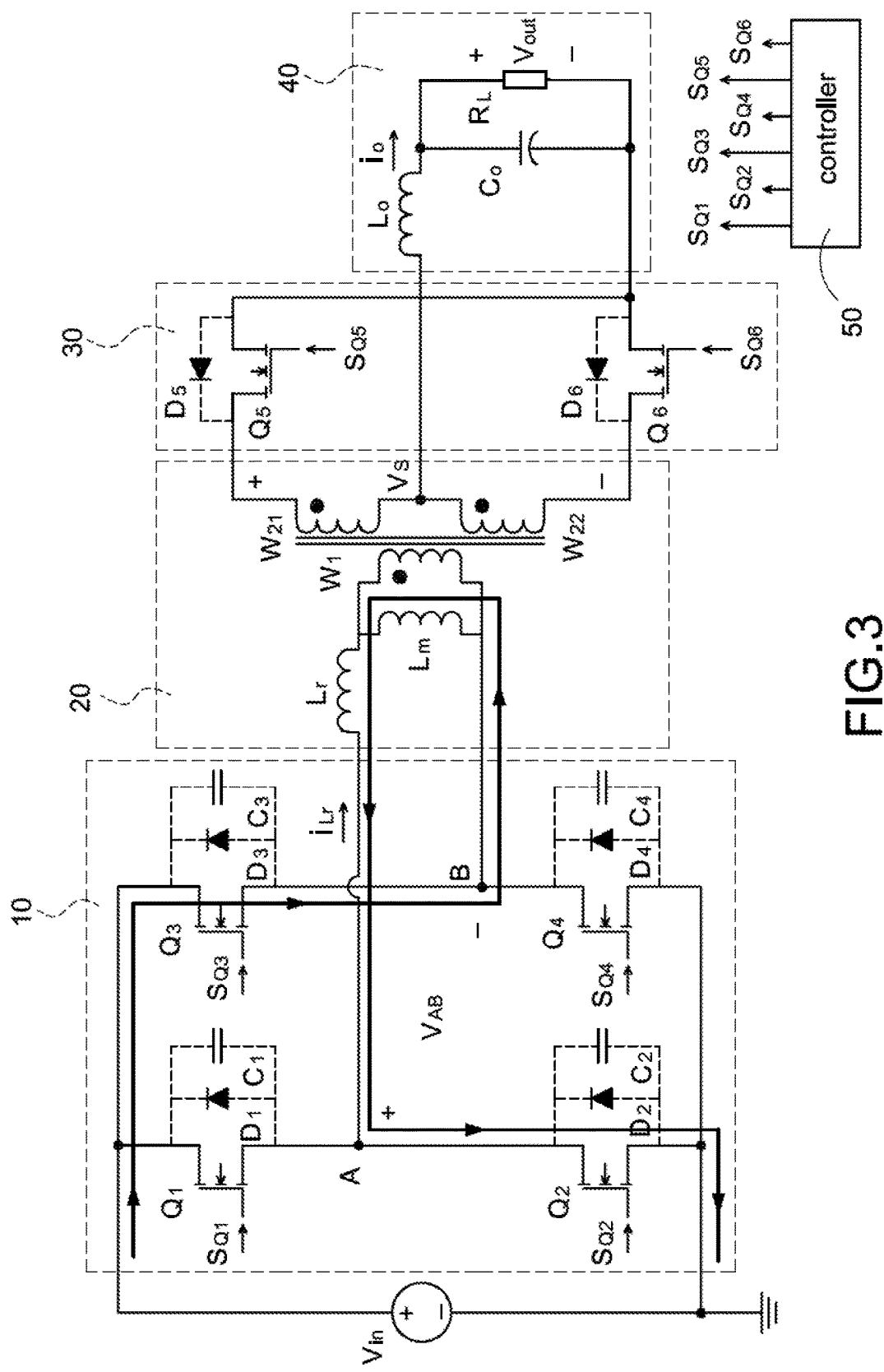
FIG. 3 is a circuit diagram of showing the PSFB converter in an energy conversion operation according to the present disclosure.

(2) From time t1 to time t2, the second power switch Q2 and the third power switch Q3 are turned on (also, the first power switch Q1 and the fourth power switch Q4 are turned off). At this time, the energy produced from the DC input voltage Vin is delivered from the primary side of the transformer 20 to the secondary side thereof. Reference is made to FIG. 3 which is a circuit diagram of showing the PSFB converter in an energy conversion operation according to the present disclosure.

(3) At time t2, the third switch control signal $S_{Q3}$ is converted from high level to low level so that the third power switch Q3 is turned off. Therefore, the energy conversion between the primary side and the secondary side is finished.

(4) From time t2 to time t3, the drain-source voltage Vds of the fourth power switch Q4 is gradually reduced and until it is zero.

(5) At time t3, the fourth power switch Q4 is turned on by the fourth switch control signal $S_{Q4}$. At this time, the fourth power switch Q4 is zero-voltage turned on because the drain-source voltage Vds of the fourth power switch Q4 is zero, thus no switching loss is produced.

Figure 4:
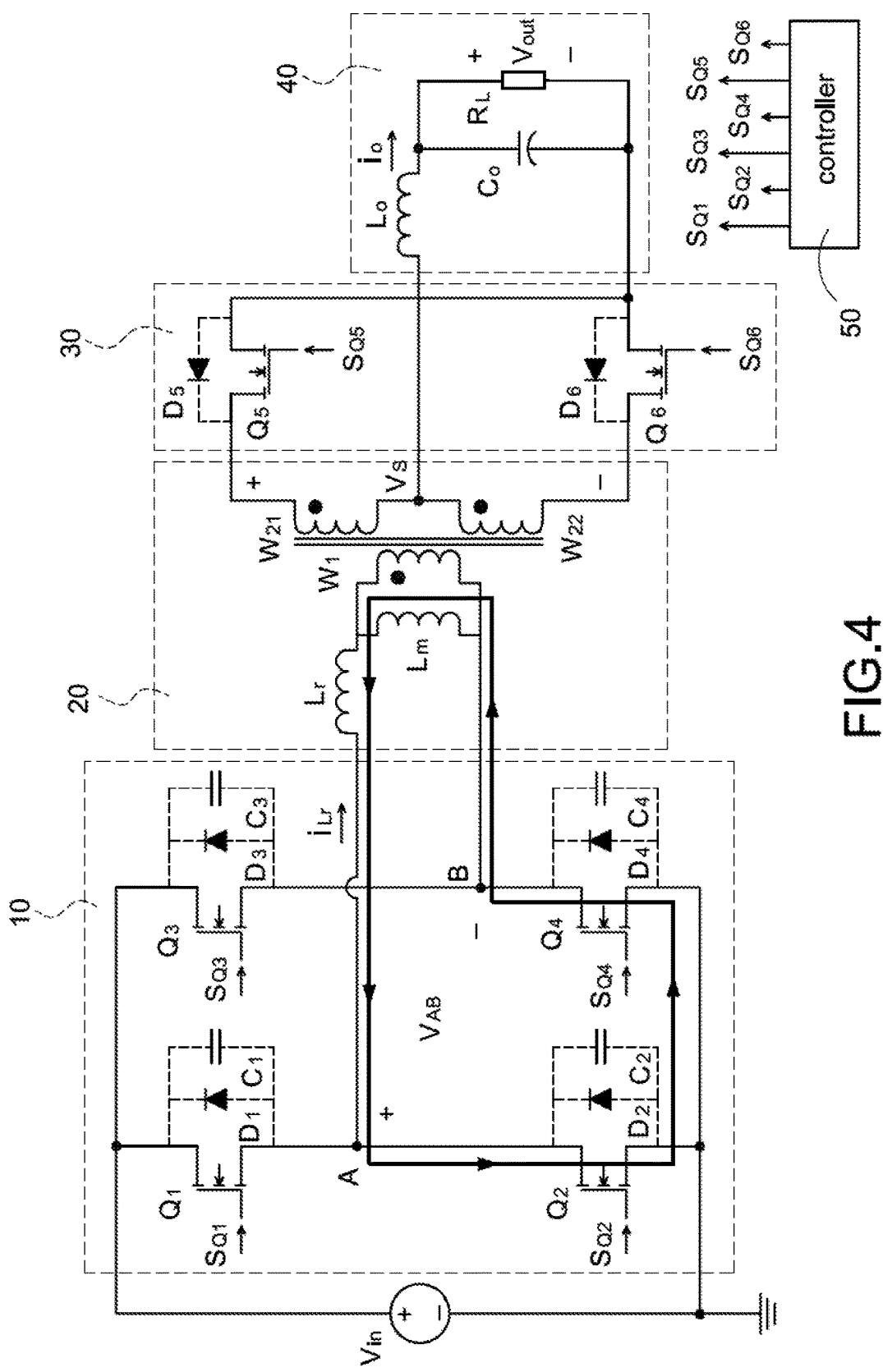
FIG. 4 is a circuit diagram of showing the PSFB converter is a freewheeling operation according to the present disclosure.

(6) From time t3 to time t4, the circuit is in the freewheeling operation. At this time, the current status of the full-bridge switching circuit 10 is that the current flows between the second power switch Q2 and the fourth power switch Q4. Reference is made to FIG. 4 which is a circuit diagram of showing the PSFB converter is a freewheeling operation according to the present disclosure.

(7) At time t4, the second power switch Q2 is turned off by the second switch control signal $S_{Q2}$.

(8) From time t4 to time t5, the drain-source voltage Vds of the first power switch Q1 gradually reduces until it is zero because the magnetizing current of the transformer 20 flows out.

(9) At time t5, the first power switch Q1 is turned on by the first switch control signal $S_{Q1}$. At this time, the first power switch Q1 is zero-voltage turned on because the drain-source voltage Vds of the first power switch Q1 is zero, thus no switching loss is produced.

Figure 5:
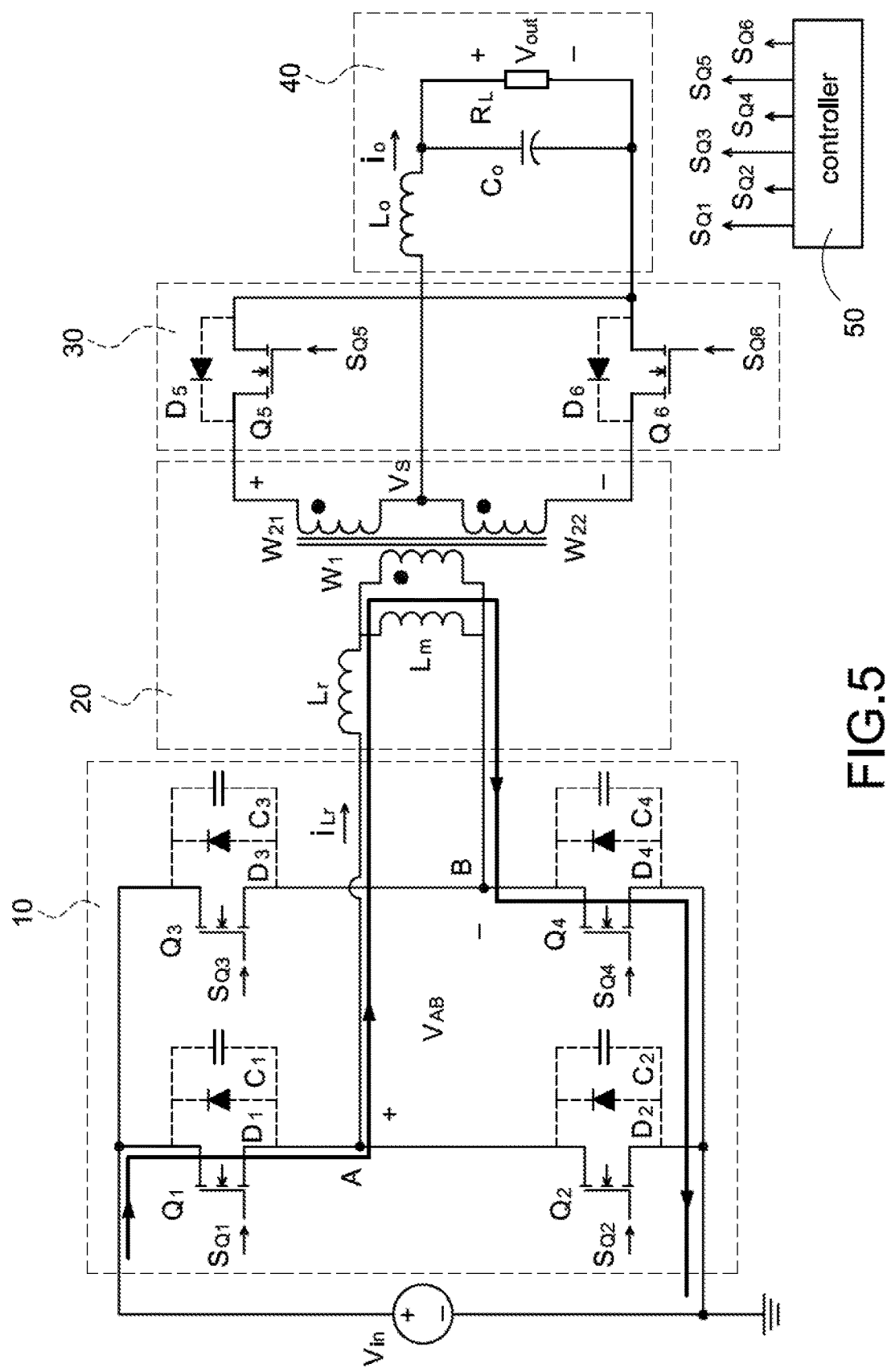
FIG. 5 is a circuit diagram of showing the PSFB converter in another energy conversion operation according to the present disclosure.

(10) From time t5 to time t6, the first power switch Q1 and the fourth power switch Q4 are turned on (also, the second power switch Q2 and the third power switch Q3 are turned off). At this time, the energy produced from the DC input voltage Vin is transferred from the primary side of the transformer 20 to the secondary side thereof. Reference is made to FIG. 5 which is a circuit diagram of showing the PSFB converter in another energy conversion operation according to the present disclosure.

Especially, at time t6 and the PSFB converter is operated in the modified PSFB (MPSFB) mode (also refer to FIG. 2B), the first switch control signal $S_{Q1}$ and the fourth switch control signal $S_{Q4}$ are simultaneously converted from high level to low level so that the first power switch Q1 and the fourth power switch Q4 are simultaneously turned off. At this time, both the energy produced from the parasitic capacitance of the first power switch Q1 and the energy produced from the parasitic capacitance of the fourth power switch Q4 are transmitted to the secondary side of the transformer 20. Finally, the drain-source voltage Vds of the first power switch Q1 and the drain-source voltage Vds of the fourth power switch Q4 is half of the DC input voltage Vin.

Figure 2C:
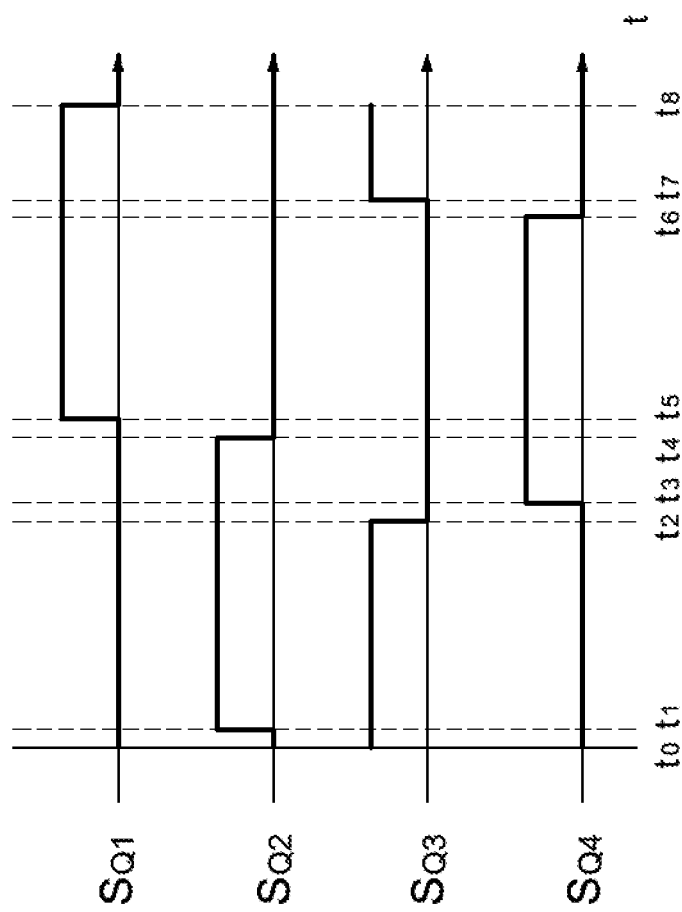
FIG. 2C is a timing diagram of operating the PSFB converter in a standard PSFB control mode according to the present disclosure.

Reference is made to FIG. 2C which is a timing diagram of operating the PSFB converter in a standard PSFB control mode according to the present disclosure. Especially, the major difference between the EPSFB control mode and the SPSFB control mode is that:

For the extended PSFB control mode, the dead bands t0-t1 and t4-t5 as shown in FIG. 2A are not determined by the resonance time of the resonance inductance and the node capacitance. Comparing to the dead bands t0-t1 and t4-t5 as shown in FIG. 2C of the standard PSFB control mode, the dead band of the extended PSFB control mode is several times of the dead band (also the resonance time) of the standard PSFB control mode.

In conclusion, the present disclosure has following advantages:

1. For the MPSFB control mode, the switching losses of each power switch is equal to $0.25 \times C \times Vin^2$ because the switching losses are jointly burdened by the second power switch Q2 and the third power switch Q3, thus significantly reducing switching losses caused from the second power switch Q2 and the third power switch Q3. At time t1, the energy generated is transported by the residual magnetizing current and the second power switch Q2 is the optimal degree of soft switching when the PSFB converter is operated in the extended PSFB control mode.

2. At time t3, the fourth power switch Q4 is zero-voltage turned on because the drain-source voltage Vds of the fourth power switch Q4 is zero; and at time t5, the first power switch Q1 is zero-voltage turned on because the drain-source voltage Vds of the first power switch Q1 is zero. The MPSFB control mode of the PSFB converter is executed to significantly reduce the switching losses of each power switch to be equal to $0.25 \times C \times Vin^2$.

3. Because of the implementation of the full-bridge switching circuit 10 and the timing control strategy thereof, it does not control the full-bridge switching circuit 10 to be operated in the burst mode by the frequency reduction. Therefore, the fast load response speed of the PSFB converter and the miniaturization design of the PSFB converter can be implemented.

4. For the MPSFB control mode, the magnetizing current (magnetic flux) would be automatically reset to zero during time t6 to next time t1, thus prevent magnetic saturation of the transformer 20.

5. The method of controlling the PSFB converter in the light load operation is provided to solve the following problems:

(1) it can not to accurately sample current to implement the magnetic balance by using the average current mode in the light load operation; and (2) it does not use the balanced capacitance at the primary side when the voltage feedback mode is executed.

6. The method of controlling the PSFB converter in the light load operation is provide to implement the optimal degree of soft driving (soft switching), improve the overall efficiency, reduce switching losses, and achieve the electromagnetic compatibility.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A method of controlling a phase-shift full-bridge (PSFB) converter in a light load operation to switch control modes by detecting magnetizing current of a transformer of the phase-shift full-bridge converter, the phase-shift full-bridge converter comprising a full-bridge switching circuit having a first power switch, a second power switch, a third power switch and a fourth power switch, the method comprising following steps:

(a) operating the PSFB converter in an extended PSFB control mode when the magnetizing current of the transformer compared to an output choke current mapped to a primary side thereof is larger;

(b) operating the PSFB converter in a modified PSFB control mode when the magnetizing current is gradually reduced until the electric charge transported by the residual magnetizing current is close to or less than or equal to a half of a DC input voltage;

(c) implementing the optimal degree of soft driving the PSFB converter to double the magnetizing current under the modified PSFB control mode; and (d) when the phase-shift full-bridge converter is operated in the modified PSFB control mode, a second switch control signal and a third switch control signal being simultaneously converted from low levels to high levels so that the second power switch and the third power switch are simultaneously turned on, switching losses being jointly burdened by the second power switch and the third power switch, wherein the full-bridge switching circuit is not controlled to be operated in a burst mode by a frequency reduction.

2. The method of controlling the phase-shift full-bridge (PSFB) converter in claim 1, wherein in the step (a), a drain-source voltage of the first power switch is charged by a current difference between the magnetizing current and a primary-side current, and the first power switch is turned on after a waiting time so as to implement the optimal degree of soft switching the first power switch; a drain-source voltage of the second power switch is discharged by a current difference between the magnetizing current and a primary-side current, and the second power switch is turned on after a waiting time so as to implement the optimal degree of soft switching the second power switch.

3. The method of controlling the phase-shift full-bridge (PSFB) converter in claim 2, wherein the primary-side current is the current that is converted from the output current of the transformer; the resonance of the current difference is substantially provided by the magnetizing current, the resonance inductance, the output filter inductance, and an equivalent in-parallel capacitance, and the resonance period is much larger than a dead band.

4. The method of controlling the phase-shift full-bridge (PSFB) converter in claim 1, wherein in the step (b), the duty cycle of the controller continually reduces to gradually reduce the magnetizing current when the loading continually reduces; under a fixed dead band, the PSFB converter is operated in the modified PSFB control mode when the electric charge transported by the residual magnetizing current is less and less until close to or less than or equal to a half of the DC input voltage.

5. The method of controlling the phase-shift full-bridge (PSFB) converter in claim 1, wherein in the step (c), the magnetizing current is doubled to ensure that the optimal degree of charging the first power switch by the residual magnetizing current when the PSFB converter is operated in the modified PSFB control mode, and the first power switch is turned on to implement the optimal degree of soft switching the PSFB converter.

6. The method of controlling the phase-shift full-bridge (PSFB) converter in claim 1, wherein in the step (c), the magnetizing current is close to zero after each switching cycle when the PSFB converter is operated in the modified PSFB control mode.

* * * * *